April 11, 1967   W. S. ZAGORSKI   3,313,905
SWITCH AND TERMINAL ASSEMBLY FOR SELECTIVELY CONTROLLING
DYNAMOELECTRIC MACHINE WINDING CIRCUITS AND THE LIKE
Filed Nov. 26, 1965   5 Sheets-Sheet 1
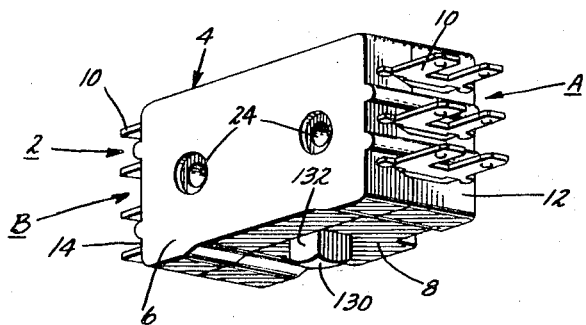
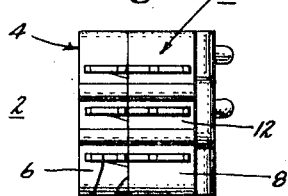
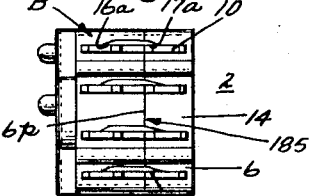
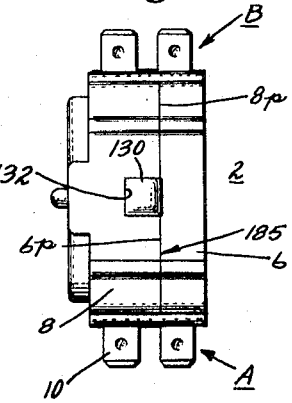
INVENTOR.
Wladyslaw S. Zagorski,
BY John M. Stoudt
Attorney.

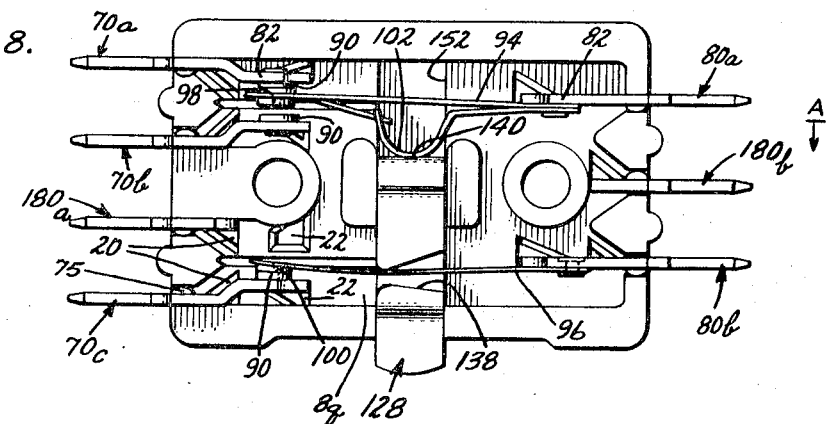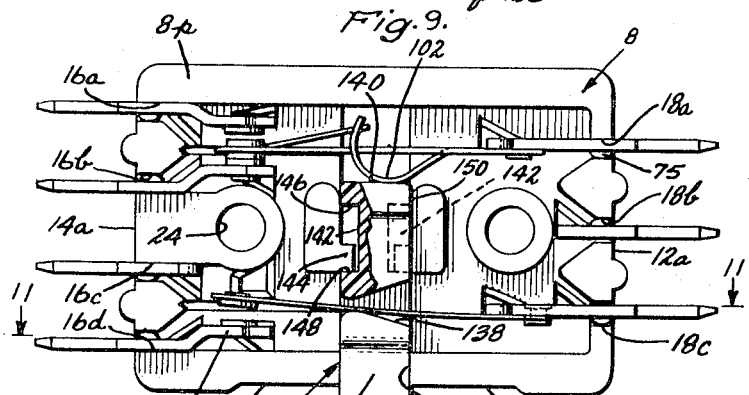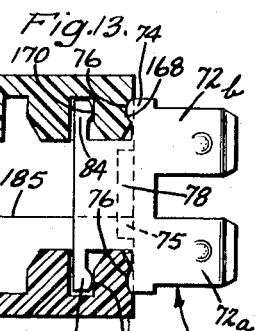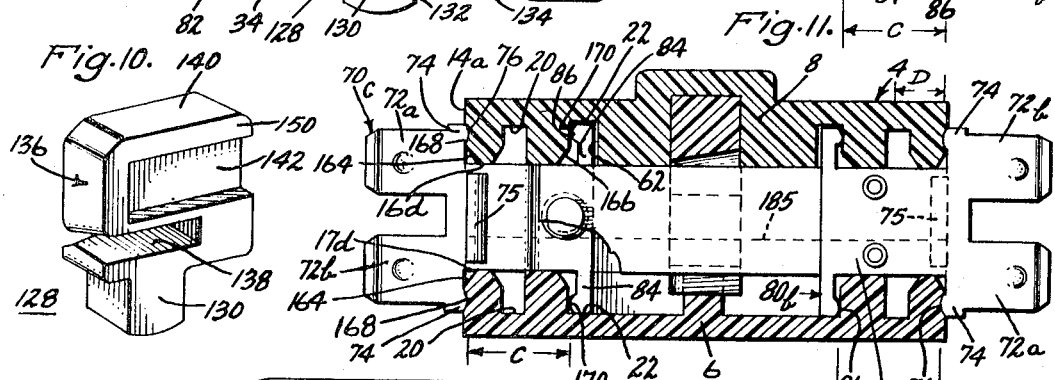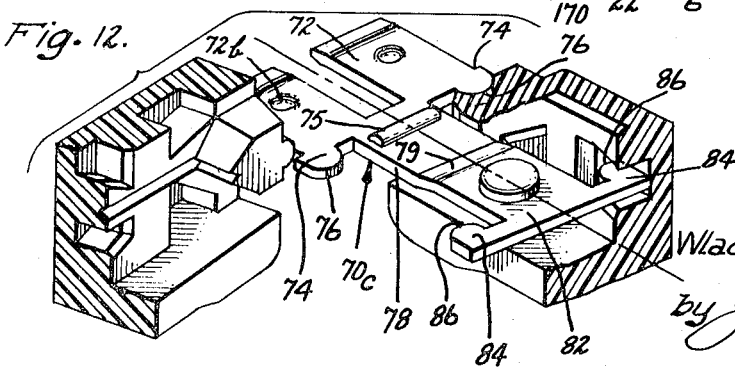

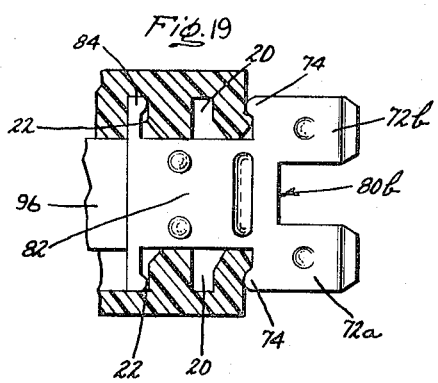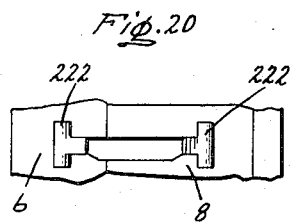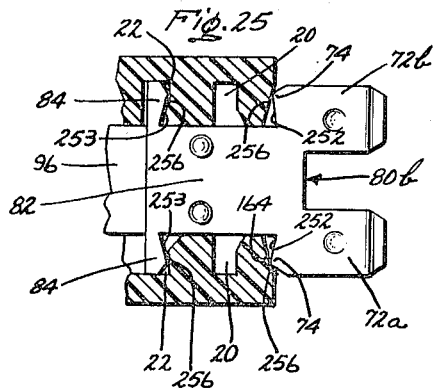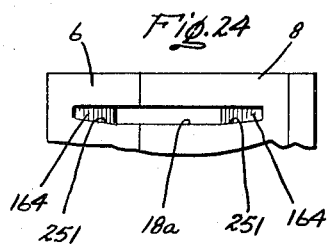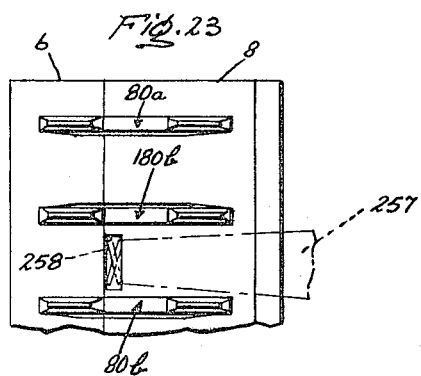

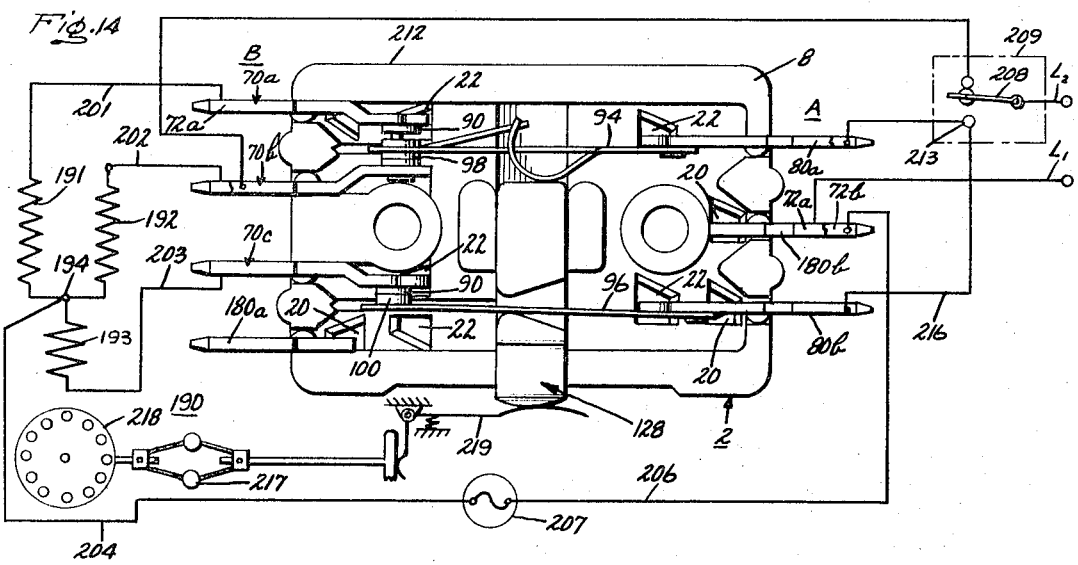

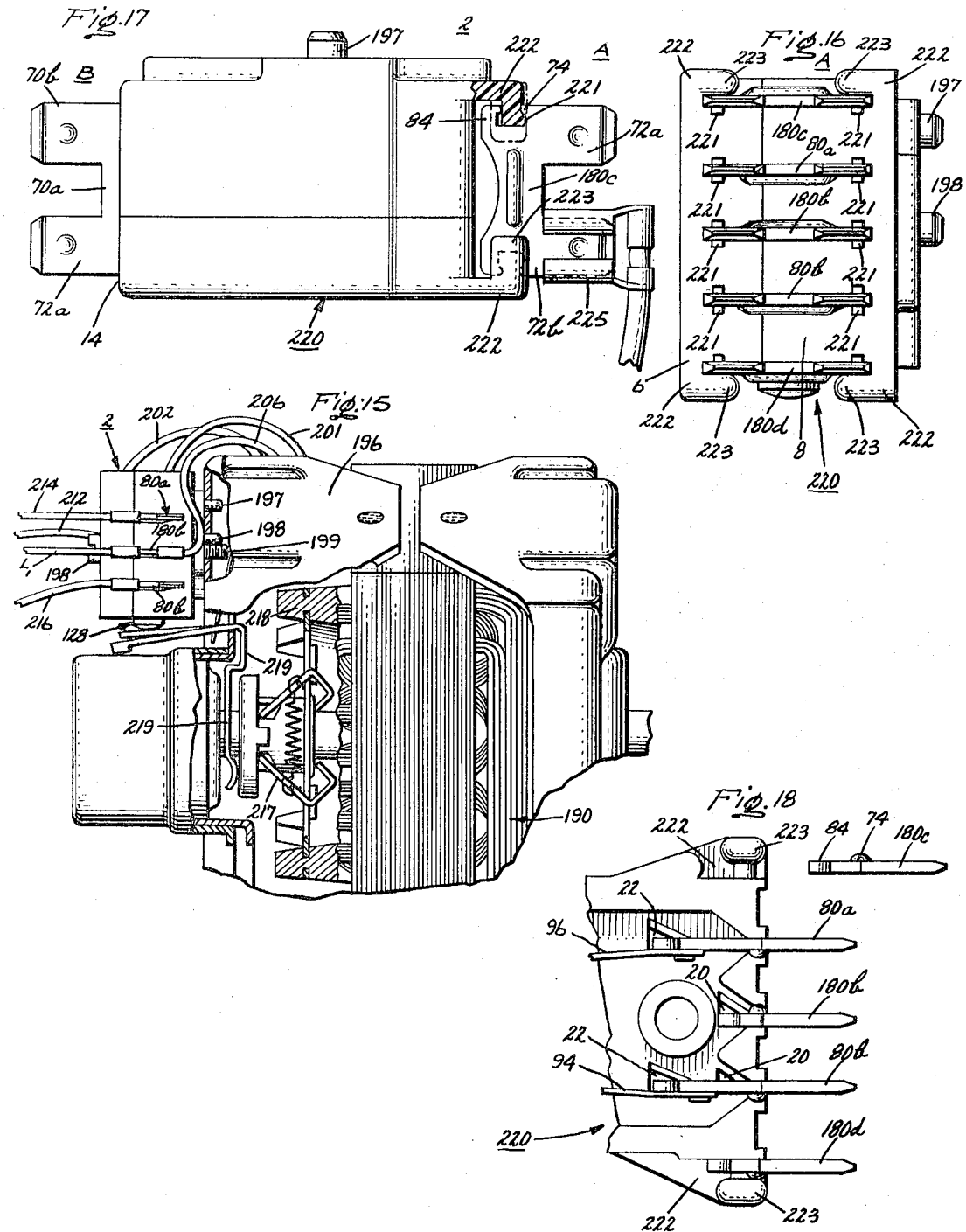

3,313,905
SWITCH AND TERMINAL ASSEMBLY FOR SELECTIVELY CONTROLLING DYNAMOELECTRIC MACHINE WINDING CIRCUITS AND THE LIKE

Wladyslaw S. Zagorski, Morrison, Ill., assignor to General Electric Company, a corporation of New York
Filed Nov. 26, 1965, Ser. No. 516,202
16 Claims. (Cl. 200—168)

This is a continuation-in-part application of my copending application Ser. No. 281,994, filed May 21, 1963 now abandoned. This invention relates to improved switch and terminal assemblies especially suitable for use in the selectively control of dynamoelectric machine windings and related circuits. In particular, the invention relates to such assemblies which are capable of controlling at least the winding circuits of single phase induction motors and, if desired, can also serve as a so-called terminal board for such motors.

Dynamoelectric machines, such as single phase induction motors having at least one main winding and an auxiliary or start winding frequently utilize a number of switches for selectively controlling a number of circuits. For example, in the aforementioned single phase induction motors, the switches are employed to de-energize the start winding once the motor reaches a predetermined operating speed and at the same time to selectively regulate other circuitry. In the past, it has been a common practice to construct such switches with at least two switch elements carried by an insulating supporting member or board. This board also mounts a plurality of spaced apart terminal studs or the like for making internal winding circuit and external power circuit connections. The arrangement is normally limited for use in connection with a particular type of motor. The switch and board unit disclosed in the G. D. Willits Patent 2,442,227, still incorporated in some motors in use today are particularly adapted for use in connection with single phase, dual voltage electric motors, is representative of this approach.

Present day winding circuit controlling requirements have raised a number of difficulties in the satisfactory utilization of approaches, such as the one described above. By way of illustration, since many different kinds of motors (single and dual voltage, single and multispeed, and reversible motors) incorporate winding circuit controlling switch units which are actuable in response to a particular motor speed, it is extremely desirable for the same basic switch unit to be capable of use in connection with the various kinds of motors without necessitating an extensive modification of the unit. Further, today motors are employed in a diversity of applications; e.g., different domestic appliances which require selective control of both internal motor and external circuits. Consequently, the same switch unit should be highly versatile in its application.

It is also quite desirable to provide a switch unit which can be readily assembled, disassembled, and subsequently reassembled, involving little effort and expense. At the same time, the unit should permit the swift and simple making of electrical connections with the proper circuit. Moreover, the unit should not only be sufficiently rugged or sturdy in construction to withstand normal stresses that it may be subjected to (e.g., handling and shipping) prior to its installation onto the desired electrical device but in addition, when employed in connection with motors, it must also be capable of satisfactory use under severe operating conditions produced by motor vibrations, relatively high current loads, and the like. The above desirable features should be achieved by a unit which is still economical to manufacture in mass production quantities.

It is therefore an object of the preesnt invention to provide an improved switch unit or switch and terminal assembly and it is a more specific object to provide such an assembly which is especially suitable for selectively controlling dynamoelectric machine winding circuitry and which incorporates the desirable features set forth above.

It is another object of the present invention to provide an improved switch and terminal assembly which is not only efficiently and economically constructed, but also is effectively held together by means capable of rapid disassembly and reassembly and yet serves in effect as a terminal board for making a variety of circuit connections.

It is still another object of the present invention to provide an improved and economical switch and terminal assembly especially suitable for selectively controlling the winding circuits of electric motors which is capable of use with different kinds of motors and in a variety of applications.

It is yet another object of the present invention to provide a dynamoelectric machine, such as an electric motor, with an improved and highly versatile yet compact switch and terminal assembly utilized in the control of the winding circuits of the machine which provides terminal locations isolated from switch terminals, is not restricted for use with one type of machine, and includes at least some of the other desirable features mentioned heretofore.

In carrying out the objects of the invention in one form, I provide an improved switch terminal assembly especially usable for controlling the winding circuits of the dynamoelectric mechine, the assembly being capable of serving in effect as a compact terminal board for making an unusually large number of circuit connections. A pair of insulating housing members have adjacent wall means, which include at least two spaced apart and generally opposed first and second engaging wall portions respectively to provide spaced apart first and second housing walls with a switch accommodating cavity formed therebetween. A plurality of fixed-contact switch terminals extend through the wall portions of the first housing wall in stacked relation to provide exposed electrical connector sections projecting beyond the associated wall. Each of these terminals has a contact supporting section supporting a contact element within the switch accommodating cavity. Through the second wall extends a plurality of movable-contact switch terminals also in stacked relation which furnish exposed electrical connector sections beyond the wall and a contact supporting section for mounting a movable contact element in the switch accommodating cavity. The switch elements of both terminal stacks cooperate within the cavity to provide the desired circuit controlling function. The switch terminals and the insulating members are formed with cooperating engaging means for holding the insulated members firmly together and for concurrently mounting the switch terminals to the members. The cooperating engaging means are disengageable such that the component parts of the assembly may be repeatedly disassembled and reassembled in a quick fashion when desired by merely using the same engaging means.

In addition, each of the housing walls has at least one dummy terminal extending through it in electrical isolation with the switch terminals to provide additionally exposed electrical connector sections. These dummy terminals have engaging means with the insulating members and augment the securement of the assembly. In order to derive the greatest amount of electrical connection benefits for the switch and terminal assembly of my invention, each of the exposed electrical connector sections of the terminals is preferably fabricated with at least two spaced apart quick-connect male tabs to furnish a common location for making a number of electrical connections swiftly and efficiently at any given terminal location.

By a further aspect of the present invention, this assembly has at least two of the fixed-contact switch terminal tabs of the one stack connected in circuit with the windings of the machine and one of the movable-contact switch terminals also connected with the windings. The remaining terminals are readily accessible for making additional internal and external electrical connections.

It will therefore be seen that among other beneficial features, a relatively few terminals not only permit the rapid external making of an unusually large number of circuit connections and serve as supports for switch elements, but in addition, they cooperate to hold the housings securely together in a manner which allows repeated disassembly and reassembly of the components with a minimum of effort. The strength of the holding means is such that in spite of the ability of the assembly to be repeatedly reassembled, it is capable of securing the assembly components together, even when the assembly is subjected to extremely severe operating conditions, while it concurrently furnishes a sturdy support for the switch elements enclosed within the assembly. These advantageous features and benefits are obtained by an assembly which is compact in construction and economical to manufacture in mass production quantities.

Further aspects of my invention will become apparent hereinafter, and the specification concludes with claims particularly pointing out and distinctly claiming the subject matter I regard as my invention. My invention itself, however, as to organization and method of operation, together with further objects and advantages thereof, may best be understood by reference to the following description when taken in conjunction with the accompanying drawings, in which:

FIGURE 1 is a perspective view of an improved pushbutton switch and terminal assembly which incorporates one form of the present invention;

FIGURE 2 is a rear view of the switch and terminal assembly of FIGURE 1;

FIGURE 3 is a bottom view of the switch and terminal assembly of FIGURE 1;

FIGURE 4 is a right end view of the switch and terminal assembly, as shown in FIGURE 1;

FIGURE 5 is a left end view of the switch and terminal assembly, as shown in FIGURE 1;

FIGURE 6 is a view looking into the recessed side of one of the housing members of the switch and terminal assembly of FIGURE 1;

FIGURE 7 is a view looking into the recessed side of the other of the housing members of the switch and terminal assembly of FIGURE 1;

FIGURE 8 is a front elevational view of the switch and terminal assembly with one of the housing members removed therefrom to show the interior of the assembly and the movable contact elements of the respective switches in one position;

FIGURE 9 is a view similar to that of FIGURE 8, but showing the movable contact elements of the respective switches in an alternate position;

FIGURE 10 is a perspective view of the switch actuator;

FIGURE 11 is a sectional view taken generally along the lines 11—11 of FIGURE 9 when both housing members are assembled together to show the mode of cooperation between switch terminals of the switch and terminal assembly and the two housing members;

FIGURE 12 is a fragmentary perspective and partially exploded view to show in further detail the mode of cooperation between the switch terminals of the switch and terminal assembly and the housing members;

FIGURE 13 as a fragmentary sectional view showing the mode of cooperation between one of the dummy terminals and the housing members;

FIGURE 14 is an elevational view of the interior of the switch and terminal assembly in a slightly modified form from that of FIGUURES 1–13, the view of the modified assembly being similar to FIGURE 9 and having the assembly shown connected in circuit with the windings of a single phase, multispeed electric motor revealed in diagram form;

FIGURE 15 is a fragmentary side elevational view of the switch and terminal assembly of FIGURE 14 mounted externally in the motor frame of the electric motor schematically shown in FIGURE 14;

FIGURE 16 is an end view of the switch and terminal assembly in another form;

FIGURE 17 is a plan view, partially broken away to show details of the assembly of FIGURE 16, the view illustrating a female quick-connect conductor member attached to one of the male terminal blades of the assembly;

FIGURE 18 is a partial elevational view of a part of the interior of the assembly of FIGURE 16 with one of the external dummy terminals disassembled;

FIGURE 19 is a fragmentary sectional view similar to the view of FIGURE 13 but showing the mode of cooperation between the switch terminals and housing members of the assembly of FIGURE 16;

FIGURE 20 is an enlarged end view of a part of the housing members seen in FIGURE 16 with the terminal removed to show details of the housing members at that location;

FIGURE 21 is a schematic circuit diagram showing the switch and terminal assembly of FIGURES 16–20 connected in the winding circuit of a single phase multispeed, reversible electric motor;

FIGURE 22 is a schematic circuit diagram showing the switch and terminal assembly of FIGURES 16–20 connected in the winding circuit of a single phase, single speed, reversible motor with the assembly having a switch available for controlling a circuit external to the motor during both starting and running conditions;

FIGURE 23 is a partial end view of yet another modified form of the switch and terminal assembly of the present invention;

FIGURE 24 is a partial view of the housing members seen in FIGURE 23 with the terminal being removed; and FIGURE 25 is a fragmentary sectional view similar to the view of FIGURE 13 but revealing details of the modified form of the assembly of FIGURE 23.

Referring to the drawings, and initially to FIGURES 1–5 thereof, I have shown one form of my invention as being embodied in a pushbutton switch and terminal assembly 2 which includes a housing 4 having a first recessed body member 6 and a second recessed body member 8. In accordance with one aspect of my invention, the body members 6 and 8 are held together in secure fashion by means of the effective cooperation of the terminals 10 therewith.

As shown in FIGURES 1–3, there are two stacks A and B of the terminals 10. Stack A is arranged to extend through housing end wall 12 of the housing 4 (FIGURE 1). Stack B is arranged to extend through opposite housing end wall 14 of the housing 4 (FIGURE 2). As further shown in FIGURE 1, the housing 4 of my improved bushbutton switch and terminal assembly 2 has a generally rectangular external configuration. Body members 6 and 8 of the housing are recessed on one side thereof as shown in FIGURES 6 and 7. More particularly, as shown in FIGURE 7, the body member 8 is recessed in such a manner as to provide a row of four spaced-apart and parallel plots 16a–16d formed entirely through end wall portion 14a thereof, and a row of three spaced-apart and parallel slots 18a–18c formed through the opposite end wall portion 12a thereof. Each of the slots 16a–16d and 18a–18c has an oblong configuration, and has its longitudinal axis perpendicular to the plane of the inner perimetrical face or wall portion 8p of body 8 in which a part of the main housing recess or switch accommodating cavity 8q is formed. Each of these slots also opens into the perimetrical face 8p of the housing member 8 and is in communication between the exterior surface of the end walls of member 8 and its cavity 8q. In general longitudinal or horizontal alignment with each of the slots 16a, 16c, 16d, 18b, and 18c there is molded into the back wall of cavity 8q of housing member 8, a trapezoidally cross-sectioned recess or notch 20 adjacent to and associated with each of the aforesaid slots. The recess 20, as best shown in FIGURES 6, 7 and 11, has four walls which are arranged in trapezoidal fashion and are perpendicular to the plane of perimetrical face 8p, and an inner surface parallel to the plane of face 8p. In further alignment longitudinally (i.e., horizontally, viewing FIGURE 7) with each of the slots 16a, 16c, 16d, and 18c there is also molded into the recessed side of housing member 8, a trapezoidally cross-sectioned recess or notch 2 constructed in the same fashion as recess 20. The recesses 22 are spaced inwardly (i.e., to the right from end wall portion 14a, and to the left from end wall portion 12a, as shown in FIGURE 7) and they are thus disposed further away from an associated slot than recess 20. In addition, the slots 16b and 18a each have a trapezoidal recess 22 spaced inwardly therefrom and in general horizontal alignment therewith. The recesses 22 associated with slots 16b and 18a are also in vertical alignment with the other recesses 22 near that particular side of the switch housing (see FIGURE 7). Lastly, the slot 18b has a trapezoidally configured recess 20 adjacent to and associated therewith. The recess 20 for slot 18b is horizontally aligned therewith and in vertical alignment with the other recess 20 near end wall portion 12a of housing member 8.

As further shown in FIGURE 7, each of the recesses 20 and 22 is of the same general construction and includes a plurality of tapered walls (see also FIGURES 11–13). The purpose of the tapered walls of each of the recesses 20, 22 is to provide a terminal entry mouth for each recess which is of gradually diminishing cross-section in a direction from the recessed side of housing member 8 toward the outer surface thereof. In view of the tapering of the mouth of each recess 20, 22, as shall be further understood hereinafter, the terminals 10 may be readily and accurately positioned into secure cooperative engagement with the body members 6 and 8 during the assembly of the switch parts.

As additionally shown in FIGURES 7 and 9, the body member 8 also includes structure for guiding and controlling the reciprocating motion of an actuating means, and a pair of spaced apart apertures 24. The apertures 24 of housing member 8 may be aligned with apertures 24 of housing member 6 after the switch and terminal assembly 2 has been fully assembled, and screws may thereupon be extended through the switch and terminal assembly 2 to secure it to part of the device which is to be controlled, such as the frame of a motor shown in FIGURE 15.

Turning now to an explanation of the structure of recessed housing member 6, as shown in FIGURES 5, 6 and 11, the body member 6 has a substantially shallower recess formed therein than body member 8, and is also of thinner external configuration. More particulary, body member 6 has a complementary external configuration when compared with body member 8, with respect to its size and shape. The body 6 is recessed in such a manner as to provide a row of four spaced-apart and parallel slots 17a–17d formed through end wall portion 14b thereof, and a row of three spaced-apart and parallel slots 19a–19c formed through the opposite end wall portion 12b thereof. The slots 17a–17d and 19a–19c have an oblong configuration, as do the slots 16a–16d and 18a–18c of member 8, and they also each have their longitudinal axis in perpendicular relationship to the plane of the inner perimetrical face or wall portion 6p of body 6 in which the other part of the main housing recess or switch accommodating cavity 6q is formed. Each of the slots 17a–17d and 19a–19c is also shorter in length than the slots 16a–16d, 18a–18c (FIGURE 5), and opens both into the perimetrical face 6p of body 6 as well as being in communication between the exterior surfaces of the respective end walls and its cavity 6q.

The slots 17a–17d, and 19a–19c of body member 6 are positioned so that when the perimetrical faces 6p and 8p of the body members 6 and 8 are placed in aligned contiguity, each one of these slots is in alignment with and opens into an associated one of the slots 16a–16d, and 18a–18c of the body member 8 for receiving one of the terminals 10. For example, as shown in FIGURE 5, the slots 16a of member 8 opens into communication with slot 17a of member 6. The uppermost terminal 10 shown in FIGURE 5 extends through the combined or overall aperture formed by slots 16a, 17a, and as set forth in detail hereinafter cooperates with each of the housing members 6, 8 to help secure them together. In like manner, and for the same purpose, each of the other slots 16b–16d and 18a–18c is aligned with and opens into communication with a respective associated slot 17b–17d, 19a–19c.

Considering further the structure of body member 6, there is molded into this member a series of trapezoidally configured recesses or notches 20 and 22 which are disposed in a similar pattern to that described above for member 8. The recesses 20 and 22 of member 6 are identical structurally to the recesses 20 and 22 of member 8 and are arranged in member 6 so that each of the recesses thereof is disposed directly opposite and identical recess of member 8. For example, as shown in FIGURE 11, the recess 20 for slot 16d of member 8 is disposed directly opposite the recess 20 of slot 17d of member 6. By the same token, the recess 22 for slot 16d of member 8 is also disposed directly opposite the recess 22 of slot 17d of member 6.

By arranging the recesses 20, 22 of member 6 in direct opposition to or in mirror image with respective associated recesses 20, 22 of member 8, a pair of opposed internal seats are provided for engagement of each terminal 10 with the two housing members 6 and 8, as shall be further set out hereinafter.

Turning now to one aspect of my invention, the switch and terminal assembly 2 includes three types of electrically conductive terminals which have been collectively referred to as terminals 10. One type of terminals 10 is a fixed contact switch terminal indicated by references 70a, 70b, and 70c in FIGURE 8, terminal 70a being shown in perspective in FIGURE 12. Terminals 70a–c are of identical construction, each including an electrical connector section having a pair of spaced apart and spade-like coplanar male tabs 72a and 72b which extend outwardly beyond the end walls 4 of housing 4 for ready engagement with a pair of appropriate quick-connecting female electrical connectors (not shown) in these figures. The male tabs 72a and 72b are each stepped laterally outwardly and rearwardly to form lateral projections 74 which are curved inwardly to provide a lip or protuberance 76, best shown in FIGURES 11 and 12, the electrical connection section being intergrally connected therefrom to an intermediate platform section or shank section 78.

As further shown in FIGURES 11 and 12, the intermediate platform section 78 has a substantially smaller width than the overall width provided by the two integral male tabs 72a and 72b of the electrical connector section and it is stepped inwardly toward the longitudinal terminal axis (shown by the dotted line in FIGURE 12). The shank section 78 of terminals 70a, b and c extends through one of the aforementioned combined slots in the housing 4, when the switch and terminal assembly 2 has been assembled (see FIGURE 5). To help provide additional overall effective thickness at each combined housing entry slot for locating a given terminal of the 70 series in the switch housing 4, a laterally embossed rib 75 is projected outwardly from one side of the shank section 78 in the given terminal of the 70 series. As further shown in FIGURES 11 and 12, the intermediate platform of shank section 78 is sloped angularly upwardly and away at 79 from the plane of male tabs 72a and 72b and is thereby integrally connected to or mounts a contact supporting section 82 remote from the tabs.

As revealed in FIGURE 8, the three illustrated switch terminals 70a, b, and c, located on the left side of the switch and terminal assembly 2, have fixed contacts 90 secured directly onto the opposed contact supporting sections or platforms 82 thereof located within the switch accommodating cavity which serve in effect as fixed contact elements of the illustrated circuit controlling switch devices. The contact supporting section 82 terminates at the end remote from the electrical connector section in a pair of outstretched or resilient lateral projections 84 which extend outwardly and transversely away from the longitudinal axis of the given terminal 70 in opposite directions. Each of the arms 84 includes a curved portion forming a lip or protuberance 86 which faces toward associated protuberance 76 of the electrical connector section and is in generally horizontal alignment therewith (viewing FIGURE 11).

It will thus be seen from viewing FIGURE 11, that switch terminals 70a, b, and c each includes on each lateral edge thereof a pair of lateral projections 74, 84 respectively having an opposed and spaced apart pair of generally facing protuberances 76 and 86. The manner in which the pairs of projections cooperate with one of the housing members 6, 8 shall be described hereinafter in more detail.

In the illustrated exemplification of FIGURES 1–13 inclusive, a second type of terminal, a movable contact switch terminal denoted by references 80a and 80b, is located on the right side of the assembly (viewing FIGURE 8). These switch terminals, like switch terminals 70a, b, and c, are each formed with an electrical connector section having coplanar male tabs 72a and 72b extending away from the exterior surface of the end walls for housing members 6, 8. They differ structurally from the first terminals 70a, b, and c primarily in that the contact supporting sections 82 of terminals 80a and 80b are coplanar with tabs 72a, 72b and mount or support in a cantilever fashion separately formed movable contact supporting arms or elements 94 and 96 within the switch accommodating cavity.

Merely for purposes of disclosing the present invention, the illustrated switch devices disposed within the housing 4 are of the type more fully discussed in the copending U.S. application of J. L. Slonneger, Serial No. 435,013, filed February 24, 1965, which is now Patent 3,293,388, granted on December 20, 1966. Briefly described, the upper switch (as viewed in the figures) is a single pole, double throw snap acting switch having a double headed contact 98 mounted on the free end of movable contact arm 94 for alternate engagement with fixed contacts 90 of terminals 70a and 70b. Movable contact arm 94 is adapted for a snap acting type of operation by means of a toggle-type spring 102, suitably secured as by rivets to the inner end or section 82 of terminal 80a associated with the arm 94. Toggle-type spring 102 engages a central tongue of the arm 94 in any convenient fashion, and thus provides snap acting operation for the double headed movable contact 98. The lower switch is a slow operating single pole, single throw, normally closed type having its movable arm 96 mounting a downwardly facing (viewed in FIGURE 8) single-headed contact 100 at the free end thereof for selective engagement with the upwardly facing contact 90 of terminal 70c.

For actuating the movable contact elements of the respective switches, reciprocating plunger 128 (see FIGURE 10) is provided, the plunger 128 includes on externally engageable portion 130 which extends outwardly through central rectangular slot 132 in the elongated housing wall 134 (FIGURE 9). The body section 136 of plunger 128 includes a tapered channel 138 for engaging and actuating movable contact supporting arm 96, and a bottom section 140 which is arranged to engage with the switch housing toggle element 102 for actuating the movable contact supporting arm 94. For guiding and limiting the reciprocating movement of the plunger 128 in the switch and terminal assembly 2 of the exemplification, a pair of opposed recesses 142 (FIGURE 9) are formed in opposite sides of the body section 136 for plunger 128. The recesses 142 receive a pair of inwardly facing molded projections 144 which are formed in body member 8 and engage the end walls 146 and 148 of the recesses 142 to limit and control the reciprocating movement of the plunger 128. For preventing undesirable lateral movement of the plunger 128 (i.e., movement of the plunger in directions transverse to the axis of its reciprocation) the opposed surfaces 150 of the plunger are fitted into a recessed channel 152 formed on the inner recesses side of body member 8, and the externally engageable portion 130 of the plunger has a rectangular configuration for disposition in the effectively rectangular slot 132 on the wall 134 of the housing 4 (see FIGURES 1 and 9).

Consequently in operation when the plunger 128 is depressed from its normal position (as shown in FIGURE 8, wherein the upper fixed contact 90 is engaged by movable contact 98), the bottom section 140 of the plunger engages the curved portion of toggle-type spring 102 and snaps the double sided movable contact 98 from its upper position (FIGURE 8) to its lower position (FIGURE 9, wherein the lower fixed contact 90 is engaged by movable contact 98). For operating the single-pole single-throw switch, the movable contact supporting arm 96 is extended through the tapered channel 138. When the plunger 128 is in its outermost position, where it is shown in FIGURE 8, the upper inner lip of channel 138 engages an adjacent surface of the arm 96 and forces the free end thereof toward fixed contact 90, which is secured to the bottom terminal 70. Movable contact 100 thereupon is closed into engagement with fixed contact 90. When the plunger 128 is depressed, the lower inner lip of plunger channel 138 acts upon the movable contact supporting arm 96 to open the contacts 100, 90 (FIGURE 9).

Referring now specifically to FIGURES 8 and 13, it will be seen that the third type of terminal for the switch and terminal assembly of the exemplification serves as a dummy termination or a common electrical circuit making element for this assembly which is electrically independent of and isolated from the switch terminals already discussed. In the illustrated exemplification, there are two such dummy terminals one in each of the stacks of terminals A and B. These dummy terminals, shown by references 180a and 180b, extend through the slots 16c and 18b of member 8 and like the terminals in numeral series 70 and 80 include an electrical connector section having a pair of tabs 72a, 72b opposed curved surfaces 76 and 86 of an intermediate platform section 78 located between the opposed surfaces 76, 86. The terminals 180a and b differ essentially from the switch terminals already considered in that they do not provide a contact supporting section 82. Thus, the out-stretched arms or resilient lateral projections 84 extend transversely outward from the end of section 78 rather than from a contact supporting section. From a comparison of FIGURES 11 and 13, it will therefore be seen that the dimension "D" between each pair of cooperating lateral projections 74, 84 of the dummy terminals is less than dimension "C" for the switch terminals, and, of course, does not provide the same degree of mounting rigidity or sturdiness attained in connection with the switch terminals. As will be explained more fully below, dummy terminal projections 84 are sprung into frictional engagement with the trapezoidally configured recesses 20 of member 8 in the same manner as those for the switch terminals. It will be understood that the purpose of the other recesses 20 in member 8 is for enabling the basic housing structure to use dummy terminals 180 in the other various slots 16a, 16c, 16d, 18c in lieu of one or more of the switch terminals 70a, b, c, and 80a, b, if such is desired.

Turning now to a detailed explanation of how the seven terminals 10 in the exemplification effectively hold the parts of the switch housing 4 together, attention is directed to FIGURES 11, 12, and 13. Before the seven terminals are seated into cooperative engagement with their associated recesses of housing body members 6 or 8, the dimensions C and D between the opposed curved surface 76 and 86 of the lateral projections 74, 84 on each side of the terminal is preferably less than the dimension therebetween after they are seated into engagement with body member 6 or 8. The uninstalled initial and resiled dimension C or D for spacing apart each pair of opposed curved surfaces 76, 86 of the cooperating and associated pairs of lateral projections is such that when an attempt is made to seat a given terminal (considering switch terminal 70a in FIGURE 11 for instance) into engagement with the housing member 8 (as shown in FIGURE 11), the curved portion 76 of lateral projection 74 adjacent male tabs 72a and 72b first engages an inclined surface 164 in one of the wall entry slots. The curved surface 86 of lateral projection 84 will also initially engage inclined surface 166 of one of the trapezoidally configured recesses 22. The inclined surfaces 164 and 166 for seating each of the terminals are inclined in opposite directions, and slope outwardly from each other in a direction away from the perimetrical faces 6p and 8p of the body members. The initial spacing of the curved surfaces 76, 86 of the lateral projections on each side of terminal 70c is therefore such that the curved portion 86 cannot enter all the way into recess 22 until resilient arm, finger or projection 84 is temporarily sprung away from lateral projection 74.

The design of the switch and terminal assembly 2 is such that it is preferable to first assemble all of the seven terminals 10 and switching elements in body member 8. With this technique in mind and still considering terminal 70c (viewing FIGURE 11), the terminal is then further thrust upwardly into engagement with housing member 8. Portion 76 of terminal 70c on the left side of FIGURE 11, thereupon rides along inclined surface 164 of its associated slot 16d and curved portion 86 (which is opposite portion 76) rides along inclined surface 166 of recess 22. Since the supporting shank of the arm 84 is relatively short (in a direction parallel to the longitudinal axis of terminal 70c), projection 84 is thereupon cammed and sprung or temporarily deflected away from the associated lateral projection 74 to increase the dimension therebetween until the projection 84 finally reaches the installed position shown in FIGURE 11.

The curved portion 76 of lateral projection 74 on the upper side of terminal 70c (FIGURE 11) thereupon becomes seated in a spherical recess 168 on outer end surface 14a of member 8, and the opposed curved surface 86 of lateral projection 84 has been cammed into engagement with transverse wall 170 to recess 22. Lateral projection 84 then tends to spring back or resile into its initial or uninstalled position and thus curved surface 86 very tightly engages the wall 170 of recess 22, to exert a secure frictional force thereupon. It will thus be appreciated that as a result of the above, the opposed curved surfaces 76, 86 of the lateral projections provide a compressive frictional engagement with body member 8 on one side of terminal 70c. The remainder of the switch terminals 70a, b; 180a, b are seated into engagement with their associated recesses 22 formed in housing member 8 in the same manner as previously described for terminal 70c. Further, dummy terminals 180a and b are similarly seated in recesses 20 as clearly revealed in FIGURE 13, terminal 180b being representative also of terminal 180a located at the other side or end wall of the housing A.

After the seven terminals of the illustrated exemplification have been effectively and securely seated into fractional engagement with body member 8 in the manner previously set forth and the plunger 128 has been suitably positioned in the recessed side of body member 8, the other housing member 6 is thereupon compressed into complementary engagement with the other sides of the seven terminals and with member 8 to complete the switch housing or casing 4. The body member 6 is thrust into engagement with body member 8 so that the opposed curved portions 76 and 86 of the pairs of lateral projections on the other side of each of the seven terminals ride along inclined surfaces 164 and 166 of member 6 and seat into tight frictional engagement with the surfaces 168 and 170 of the recesses 20, 22 of member 6, in the same manner as previously described for member 8.

As shown in FIGURES 3 and 5, when the contiguous surfaces of the mating housing members 6 and 8 are secured into engaged relationship, the perimetrical faces 6p and 8p are in contiguity to provide a perimetrical seam 185 which has a generally rectangular configuration and is in a plane perpendicular to the general plane assumed by each of the various types of terminals 70, 80, and 180. This plane of the seam 185 is also generally parallel to the direction in which the terminals extend. It will further be understood that each pair of lateral projections 74, 84 exerts a compressive force upon an associated one of the housing members 6, 8 which is parallel to the plane of the seam 185.

With the terminals in the exemplification of FIGURES 1-3 inclusive seated into cooperative engagement with the body members 6 and 8, a compressive engagement securely maintains the body members 6 and 8 into a compact and integrated relationship, without necessitating the use of any supplemental hardware where such is desired. The members may subsequently be readily disassembled from each other by means of a suitable tool, such as a knife inserted into the perimetrical seam 185 between the housing members to pry these members apart and disengage one or the other of the housing members from its associaed terminals.

It will therefore be seen from the foregoing description of FIGURES 1-13 inclusive that the present invention provides an improved yet highly versatile and rugged switch and terminal assembly which may be rapidly assembled and subsequently disassembled with a minimum of effort. In particular, by one aspect of the invention, a relatively few terminals of the compact assembly not only permit the rapid external making of an unusually large number of circuit connections, but in addition, they cooperate to hold the switch housings securely together. At the same time, the switch terminals of the assembly also furnish a sturdy support for switching elements enclosed within the switch and terminal assembly. Thus, the assembly is readily capable of satisfactory use with a multiplicity of switch devices having entirely different structural contact elements. The same basic assembly is also suitable for a variety of different kinds of applications, even for the control of a number of diverse dynamoelectric machine winding circuits and other circuitry where the assembly is subjected to extremely severe conditions, such as motor vibrations, high current or power loads and the like.

The versatility and other beneficial features of the present invention are further revealed in FIGURES 14 and 15 where like components set out in connection with the first thirteen figures are identified by like character references. More specifically, as better seen from a comparison of the switch and terminal assembly shown in FIGURE 14 with that of FIGURES 8 and 9, the assembly of FIGURE 14 differs from that already described principally in the interchange of location of fixed contact supporting terminal 70c and dummy terminal 180a in terminal stack B and in the mounting of movable contact 96 on terminal 80b of terminal stack B so that movable contact 100 faces fixed contact 90 of terminal 70c to provide a normally open single pole single throw switch rather than a normally closed one. In all other respects, the switch and terminal assembly construction and operation of the unit in FIGURES 14 and 15 are similar to that already discussed for FIGURES 1–13 inclusive.

FIGURE 14 shows switch and terminal assembly 2 utilized as a switch and electrical circuit making unit in circuit controlling relation with the windings of a single phase, multi-speed induction motor 190. In the illustrated exemplification, the motor has two main field windings 191, 192 selectively energized to provide two different speeds of operation and an auxiliary start winding 193 connectable in parallel with main winding 192 during starting conditions. These windings may be arranged on the stator and interconnected in any suitable manner, such as that disclosed in the H. C. Stout Patent 3,153,183, issued October 13, 1964. One side of windings 191, 192 is connected by conductors 201, 202 having suitable female quick-connect connectors respectively (not shown) to one of the tabs in terminal stack B of fixed-contact switch terminals 70a and 70b for the upper switch (as viewed in FIGURE 14). The other side of each winding is connected at common point 194 to one side of start winding 193 which is in turn connected by conductor 203 and its quick-connect to one of the exposed tabs of fixed-contact switch terminals 70c. The three windings are selectively connectable across a suitable source of alternating power by external power line $L_1$ to one of the tabs of dummy terminal 80b in terminal stack A. Winding point 194 is connected in circuit with the second tab of terminal 80b by conductors 204, 206 through a standard thermal protector device 207.

The other power line $L_2$ is in circuit with the movable arm 208 of a single pole double throw speed selector switch 209 having a high speed contact post 211 in circuit by conductor 212 with the second tab of fixed-contact switch terminal 70b. The low speed contact post 213 is in circuit with both movable-contact switch terminals 80a, 80b of terminal stack A via leads 214, 216.

Under starting conditions, for high speed operation and with the plunger 128 being depressed, the switch components are disposed in the relative positions depicted in FIGURE 14 so that winding 191 is in open circuit and main winding 192 is energized across lines $L_1$, $L_2$. Winding 192 is excited through switch terminal 70b on the one side and dummy terminal 180b on the other without resort to either switch terminal 80a or 80b which are in open circuit at 213. The start winding is excited in parallel with winding 192 from point 194 through fixed-contact switch terminal 70c, the engaging contacts of the lower switch (as viewed in FIGURE 14), terminal 80b, conductors 216, 214, the closed contacts of the upper switch to fixed contact switch terminal 70b. From there a closed circuit is made with line $L_2$ through post 211 and arm 208 of switch 209. When the motor attains a predetermined speed, the plunger is transferred into its extended position (not shown) and movable contact element 94 becomes disengaged from the contact of terminal 70b to engage contact 90 of terminal 70a. At the same time, the lower switch is opened to interrupt the start winding cricuit thereby deenergizing it.

The speed responsive centrifugally operated mechanism 217 attached to rotate with the rotor 218 and the linkage 219 for actuating plunger 128 may take any form and are revealed in FIGURES 14 and 15 as being constructed in accordance with the disclosure of the James L. Waters patent application Serial No. 306,815, filed September 5, 1963, now Patent No. 3,271,602, where mechanism 217 and linkage 219 and their operation are described in detail. Suffice it to say that at a predetermined speed, centrifugal force operates mechanism 217 to the left to pivot linkage 219 away from switch plunger 128 thereby allowing it to be forced into its extended position by the switches of assembly 2.

For low speed operation, arm 208 is moved into contact with post 213 and under starting conditions with switch elements 94, 96 in the illustrated positions shown in FIGURE 14, windings 192, 193 will be energized in parallel between points 194, 213 across lines $L_1$, $L_2$. Winding 191, having one end attached to terminal 70a which is in open circuit, is deenergized. When the predetermined speed is reached and contact 98 is moved into selective engagement with contact 90 of terminal 70a, the circuitry of windings 192, 193 will be interrupted and only winding 191 is excited. That is, winding 191 is energized for low speed between terminals 80a and 180b across lines $L_1$, $L_2$.

Referring to FIGURE 15, it will be seen that the assembly of FIGURE 14 is mounted externally on the end frame 196 of motor 190 by integral projection 197 which enter complementary holes in the frame and by a pair of screws 198 which extend through aligned apertures 24 of secured together housing members 6, 8. These screws are threaded into suitably provided frame holes 199 for this purpose and further augment the securement attained by the interengaging or interlocking terminal and housing members. It should be additionally noted at this time and it wil become more apparent from the subsequent disclosure that in order to derive the most beneficial use of the present invention in connection with motor applications, each stack of terminals should include at least three terminals, with each terminal stack having at least two switch terminals. This interrelationship provides sufficient strength of securement under normal conditions for the housing members until mounted onto the motor as well as thereafter and furnishes a compact unit which is quite versatile and can be used with a number of different types of motors. In the embodiment of FIGURES 14 and 15, if desired, dummy terminal 18a could have been eliminated but its inclusion not only augments securement of the members, but also provides a second isolated electrical connection location, increasing even further the versatility of the assembly 2 without necessitating its reconstruction.

Turning now to FIGURES 16–22 inclusive, a modified form of the present invention is illustrated which has even greater versatility than the assembly 2 shown and described for FIGURES 1–15 inclusive. For simplicity and brevity of description, the same switching devices of Slonneger are incorporated in the assembly but it should be recognized from the foregoing that my invention may incorporate switching devices other than the illustrated ones. The switch and terminal assembly 220 of FIGURES 16–22 is essentially the same as that previously set out except that (1) the terminals have their lateral projections 74 interengaging or interlocking in a positive clamping fashion with shoulders 221 molded onto the opposed end walls 12, 14, housing members 6, 8 (rather than with recesses or depressions 168 of FIGURE 11), and (2) terminal stack A includes additional two-spaded dummy terminals 180c and 180d. In all other respects, assembly 220 is like assembly 2 and provides an unusually large number of common electrical locations which receive female suitable quick-connect connectors 225 (FIGURE 17). In this exemplification, end wall 12 of members 6, 8 is molded with upright wall extensions 222 on the outer surface of the housing. These extensions, in turn, are provided with overlying lateral portions which extend toward one another in the manner best shown in FIGURES 16 and 17 thereby supplying slightly greater strength to the securement of members 6, 8 in their assembled relation. More important is the additional versatility in use for the assembly provided by these terminals.

For example, as schematically revealed in FIGURES 21 and 22, the switch and terminal assembly 220 is connected in the circuit of a single phase multispeed reversible motor (FIGURE 21) and of a single phase, single speed reversible motor (FIGURE 22). With respect to the circuit of FIGURE 21, one side of main windings 191, 192 is respectively attached to fixed-contact switch terminals 70a, 70b and terminals 70b, 80a in circuit with posts 211, 213 of selector switch 209 in the manner discussed for FIGURE 14. The other side of the windings at point 194 is connected to line $L_1$ through the thermal protector device 207 and the lower dummy terminal 180d rather than dummy terminal 180b. The start winding 193 is in parallel with winding 192 between lines $L_1$, $L_2$, the direction of current flow through the start winding being governed by a double pole double throw reversing switch 229. One side of start winding 193 is in series with point 194 through terminals 70c, 80b, conductors 231, 232, dummy terminal 180b and conductor 233. The other side of winding 193 uses dummy terminal 180a, conductor 234, switch 229 and conductor 236 to post 211. For low speed, conductors 212, 214 and the upper switch of assembly 220 plate that side in circuit with post 213 and line $L_2$. Like the dummy terminal 180a in the embodiment of FIGURE 14, the two exposed tabs of dummy terminal 180c in stack A are isolated and are available for use in the equipment which incorporates the motor.

In the single speed reversible motor of FIGURE 22, the upper switch of the assembly 220 is available to control an external electrical device (not shown) during both start and running conditions. Main winding 192 is in series with lines $L_1$, $L_2$ through dummy terminals 180a, 180b via conductors 206, 204, 202, and 238. The start winding 193 is connected between switch terminal 70c of the lower switch and dummy terminal 180d. Reversing switch 229, in circuit with winding 193 through terminals 80b, 70c, 180c, 180b, and 180d, conductors 241, 242, 243, 244, 246, 238, and 248 controls the direction of current through the winding and, consequently, the direction of rotation for the motor.

FIGURES 23–25 reveal a modified form of obtaining interengagement between housing members 6, 8 and the various terminals for the switch and terminal assembly. Unlike the assembly of the preceding figures, the engagement shown by the three latter figures does not provide the same type of interlock of parts between lateral projections 74 and the associated end walls of members 6, 8. As best seen in FIGURES 24 and 25, the termination of the slots 18a etc. are wedge shaped in over-all cross section and sloped as indicated at 251, with the narrowest part of the slot being located away from its center. In addition, the linear dimension between edges 252, 253 which face one another in each cooperating pair of lateral projections 74, 84, gradually decrease as the distance away from section 82 increases to provide edges which slope toward one another. Further, each projection preferably includes a sharp edge 256 near its outer periphery which tends to bite into the material of the associated housing member and effectively resists separation of the housing members. The sloping walls and edges facilitate assembly of the components in the manner described for the first embodiment and assist in furnishing a tight friction fit or compressive engagement of the parts as the lateral projections 84 becomes slightly and temporarily deflected by virtue of the construction of the terminals and, similar to the other embodiments, the spring-like characteristics of projections 84. The unit may readily be disassembled when desired by use of a screw driver 257 (FIGURE 25) having its end placed into a suitable recess 258 formed in the end wall of one housing member, next to the other housing member, and then twisting the screw driver against the other member to overcome the compressive engagement between the members and the individual terminals.

It will thus be appreciated from the foregoing that the present invention provides many advantageous features. Among other things, a compact and economical, yet highly versatile, switch and terminal assembly is furnished which allows the rapid making of an unusually large number of circuit connections with relatively few component parts. Further, the assembly can readily be assembled, disassembled, and reassembled without need for new securing means and the terminals provide a satisfactory and unusually sturdy support for switch elements even when the unit is used under severe operating conditions, such as motor applications. In this latter regard, the same basic unit can be employed in connection with the circuit control for a number of different types of motors in a diversity of applications.

It should be apparent to those skilled in the art, while I have shown and described what at present are considered to be the preferred embodiments of my invention in accordance with the patent statutes, changes may be made without actually departing from the true spirit and scope of this invention, and I therefore intend to cover in the following claims all such equivalent variations as fall within the invention.

What I claim as new and desire to secure by Letters Patent of the United States is:

1. In an electrical device including a plurality of insulating members forming a housing, one of said insulating members including a wall portion in contiguous relationship with a wall portion of an adjacent insulating member, each of said contiguous wall portions having a slot formed therein, said slots aligned to form a terminal receiving slot, said housing having a depression on its outside surface adjacent the closed end of each of said slots, each of said insulating members having a recess formed therein inside of said housing and spaced from said slot and a terminal including two tabs, a shank section, two resilient arms and a first and second pair of lip elements, said shank section joining said tabs and extending through said terminal receiving slot, said resilient arms extending from said shank section inside said housing, each of said arms associated with a respective one of said tabs, one of the lip elements of said first pair formed on one of said tabs and the other lip element of said first pair formed on the arm associated with said tab, said first pair of lip elements projecting toward one another, one of the lip elements of said pair formed on the other of said tabs and the other lip element of said second pair formed on the other arm, said second pair of lip elements also projecting toward one another, said first pair of lip elements engaged with one of said insulating members with the lip element on the tab engaged in the depression on said insulating member and with the lip element on the arm engaged with the recess, and said second pair of lip elements engaged with the other of said insulating members with the lip element on the tag engaged in the depression on said other insulating member and with the lip element on the arm engaged with the recess to hold the insulating members in assembled relation to form the switch housing.

2. A switch comprising contact means, a plurality of insulating members forming a housing for said contact means, with two walls having a terminal receiving slot in each of said walls and a depression on an outside surface of said housing adjacent the closed ends of each of said slots, each of said insulating members having a recess formed inside of the housing and spaced from each of said slots, and a plurality of terminals, each terminal including a tab portion, a shank section, two arms and a first and second pair of lip elements, said shank section of each terminal extending through a respective one of said terminal receiving slots, said two resilient arms of each terminal extending from opposite sides of the shank section inside the housing, one of the lip elements of said first pair formed on one side of said tab portion and another of said lip elements of said first pair formed on one of said arms, said first pair of lip elements projecting toward one another, one of the lip elements of said second pair formed on the opposite side of said tab portion and the other of said lip elements of said second pair formed on the other arm, said second pair of lip elements projecting toward one another, each of said terminals having its first pair of lip elements engaged with said housing with the lip element on the tab portion engaged in one of the depressions on the outside surface of said housing and the lip element on the arm engaged in one of said recesses, and having its second pair of lip elements engaged with said housing with the lip element on the tab portion engaged in another of the depressions on the outside surface of said housing and the lip element on the arm engaged in another of said recesses to secure the insulating members together.

3. A switch comprising contact means, a plurality of insulating members which combine to provide a housing for said contact means, each insulating member including a perimetrical wall portion in contiguous relationship with a perimetrical wall portion of an adjacent insulating member, each of said contiguous perimetrical wall portions having a slot, said slots being aligned and together forming a terminal receiving slot, said housing having a depression adjacent the closed end of each of said slots, a wall portion of each of said insulating members defining a recess inside of said housing, and a terminal including two tabs, a shank section, two resilient arms, and a first and second pair of lip elements, said shank section joining said tabs and extending through said terminal receiving slot, said resilient arms extending from said shank section inside said housing, one of the lip elements of said first pair formed on one of said tabs and another of said lip elements of said first pair formed on one of said arms, said first pair of lip elements projecting toward one another, one of said lip elements of said second pair formed on the other of said tabs and the other of said lip elements of said second pair formed on the other arm, said second pair of lip elements projecting toward one another, said first pair of lip elements engaged with said housing with the lip element on the tab engaged with one of said depressions and the lip element on the arm resiliently engaged in one of said recesses, said second pair of lip elements being engaged with the housing with the lip element on the tab engaged with the other of said depressions and the lip element on the arm resiliently engaged in the other of said recesses.

4. A switch comprising contact means, a pair of recessed insulating members which combine to form a housing for said contact means, each insulating member including a pair of opposed external walls in contiguous relationship respectively with a pair of opposed external walls of the other insulating member thereby to form a pair of opposed external housing walls, each of the housing walls including a terminal receiving slot formed therethrough, each terminal receiving slot located partially within the external wall of one insulating member and partially within the contiguous external wall of the other member, a plurality of terminals for said switch, and engaging means formed on at least one of said terminals and said housing, said engaging means including at least one lip element cooperating to secure said insulating members in assembled relation, each insulating member including a plurality of recesses having a trapezoidal cross section, one of said recesses being spaced inwardly from and in general alignment with the part of each slot through which the terminal extends, each of the terminals including a tab portion with a pair of sides and a pair of resilient fingers, each of said sides facing a respective one of the resilient fingers, each of said fingers being temporarily deflected into engagement with a recess of one or the other of said insulating members and the sides of said tab portion engaging the outside of the housing, said sides of said tab portions and said resilient fingers holding the insulating members in asembled relation.

5. A switch and terminal assembly comprising a plurality of recessed electrically insulated housing members having adjacent wall means including first engaging portions forming a first housing wall in spaced apart and generally opposed relation to second engaging wall portions forming a second housing wall and having an interior switch accommodating cavity formed between said first and second housing walls; at least one fixed-contact switch terminal extending through said first housing wall, said fixed-contact switch terminal having an electrical connector section exposed beyond said first housing wall and a contact supporting section positioned within the switch accommodating cavity; at least one movable-contact switch terminal extending through said second housing wall, said movable-contact switch terminal including an electrical connector section exposed beyond said second housing wall and having a contact supporting section mounting a movable contact element in the switch accommodating cavity for selective engagement with the fixed contact switch terminal; and a dummy terminal extending through said adjacent wall means in electrical isolation with the switch terminals, said dummy terminal having an electrical connector section exposed beyond the associated adjacent wall means, and the electrical connector section of more than one of said terminals comprising at least two spaced apart connector portions for making a number of external electrical connections for the same terminal.

6. The switch and terminal assembly of claim 5 in which a first plurality of said terminals extend through said first engaging wall portions and a second plurality of said terminals extend through said second engaging wall portions of said housing members; said first and second pluralities of terminals having means in cooperative engagement with associated means of said housing members for securing said housing members and terminal pluralities firmly together in an assembled relation; the cooperative engaging means of said housing members and of said terminal pluralities being disengageable from one another thereby allowing repeated disassembly and reassembly of said switch and terminal assembly when desired by using the same engaging means.

7. The switch and terminal assembly of claim 5 in which the electrical connector sections for substantially all of said terminals are in stacked relation at each of said housing walls and comprise a pair of spaced apart male connector portions for quick assembly with female electrical connectors to provide a common electrical connection location for making at least two external connections with each terminal.

8. The switch and terminal assembly of claim 5 in which selected switch terminals and selected dummy terminals each include housing engaging means, and said housing members are each formed with switch and dummy terminal engaging means at least at one location on the assembly to provide for the substitution of the selected switch and dummy terminals for one another at that one location.

9. A switch and terminal assembly comprising a housing formed by at least two members having at least two spaced apart and generally opposed wall portions in adjacent relation to provide first and second housing walls in spaced apart relation; said members including a switch accommodating cavity formed between said first and second housing walls; at least one fixed-contact switch terminal extending through the adjacent wall portions of said first housing wall, said fixed-contact switch terminal having an exposed electrical connector section projecting beyond said first housing wall and a contact supporting section positioned within the switch accommodating cavity; at least one movable-contact switch terminal extending through the adjacent portions of wall of said second housing wall, said movable-contact switch terminal including an exposed electrical connector section projecting beyond said second housing wall and having a contact supporting section mounting a movable contact element in the switch accommodating cavity for selective engagement with the fixed-contact switch terminal; means securing the two housing members together in removable relation comprising cooperating engaging means on each of said switch terminals and said members for holding said members firmly together and for concurrently mounting said terminals to said members, said cooperating engaging means of said switch terminals including associated first and second spaced apart lateral projections extending from each side edge of the switch terminals, with the first lateral projections disposed externally of the associated housing wall and the second lateral projections positioned within the housing; at least one of said first and second lateral projections of said switch terminals being temporarily deflectable away from the associated lateral projections during assembly of said switch and terminal assembly and being resiled when disengaged from the housing whereby the assembly may be repeatedly disassembled and reassambled when desired by using the same cooperating engaging means.

10. The switch and terminal assembly of claim 9 in which the electrical connector section of each switch terminal comprises a pair of spaced apart connector portions to provide a common electrical connection location for making at least two external connections with each switch terminal.

11. The switch and terminal assembly of claim 9 in which at least one dummy terminal extends through the adjacent wall portions of said first and second housing walls in electrical isolation with the switch terminals; said dummy terminals including an exposed electrical connector section projecting away from the associated exterior surface housing wall; each of said dummy terminals and said housing members having interengaging means for mounting the dummy terminals in position and for augmenting the securement of the housing members in assembled relation.

12. The switch and terminal assembly of claim 11 in which a dummy terminal is also mounted on the exterior surfaces of said housing members adjacent one of said housing walls.

13. In a dynamoelectric machine having winding means, a switch and terminal assembly for controlling the circuit of the winding means, said assembly comprising a plurality of housing members secured together to provide first and second spaced apart housing walls having a switch accommodating cavity therebetween; a first plurality of terminals extending through said first housing wall and a second plurality of terminals extending through said second housing wall; said terminals and housing members including means for securing said members together and for mounting said terminals; said terminals having electrical connector sections exposed beyond the associated housing wall; at least two of said terminals in each of said terminal pluralities being switch terminals supporting switch means within the switch accommodating cavity for selective engagement with switch means of the other terminal plurality, the connector sections of said switch terminals being formed by at least two spaced apart connector portions; and more than one connector portion of the switch terminals in at least one of said pluralities being connected in circuit with the winding means.

14. The dynamoelectric machine of claim 13 in which each terminal plurality is in stack relation and at least one of the terminals in each of said stacked pluralities comprises a dummy terminal having at least two spaced apart electrical connector portions exposed beyond the associated housing wall, said dummy terminals including at least one of said connector portions attached in circuit with the winding means.

15. In a multispeed dynamoelectric machine having winding means for selective operation of the machine at two or more speeds, a switch and terminal assembly for controlling the circuit of the winding means plurality, said assembly comprising a number of housing members secured together to provide first and second spaced apart housing walls having a switch accommodating cavity therebetween; a first plurality of terminals extending through said first housing wall and a second plurality of terminals extending through said second housing wall; said terminals securing said housing members together and having electrical connector sections exposed beyond the associated housing wall; at least two of said terminals in each of said terminal pluralities being switch terminals supporting switch means within the switch accommodating cavity for selective engagement with switch means of the other terminal plurality; the connector sections of said switch terminals formed by at least two spaced apart connector portions with at least two of said switch terminals in said first terminal plurality being connected to said winding means and at least one of said terminals in said second terminal plurality being connected in circuit with the winding means to provide energization of at least part of said winding means.

16. The multispeed dynamoelectric machine of claim 15 in which each terminal plurality is in stack relation and said one terminal in said second terminal plurality comprises a dummy terminal having its connector section formed by at least two spaced apart electrical connector portions.

References Cited by the Examiner

UNITED STATES PATENTS

| | | | |
|---|---|---|---|
| 2,840,657 | 6/1958 | Roeser | 200—168 X |
| 2,974,302 | 3/1961 | Ellis | 339—256 |
| 3,221,094 | 11/1965 | Cherry | 174—59 |

ROBERT K. SCHAEFER, *Primary Examiner.*

H. O. JONES, *Assistant Examiner.*